US008845003B2

(12) United States Patent
Still et al.

(10) Patent No.: US 8,845,003 B2
(45) Date of Patent: Sep. 30, 2014

(54) SNAP-IN FASTENER

(75) Inventors: Kevin A. Still, Wyoming, MI (US);
Kenneth Kreuze, Holland, MI (US);
Michael Selle, Holland, MI (US);
Ronald C. Perry, Jenison, MI (US);
Rodney J. Tindall, Zeeland, MI (US)

(73) Assignee: Johnson Controls Technology Company, Holland, MI (US)

(*) Notice: Subject to any disclaimer, the term of this patent is extended or adjusted under 35 U.S.C. 154(b) by 789 days.

(21) Appl. No.: 12/674,712

(22) PCT Filed: Aug. 29, 2008

(86) PCT No.: PCT/US2008/074770
§ 371 (c)(1),
(2), (4) Date: Feb. 15, 2011

(87) PCT Pub. No.: WO2009/029778
PCT Pub. Date: Mar. 5, 2009

(65) Prior Publication Data
US 2011/0127795 A1 Jun. 2, 2011

Related U.S. Application Data

(60) Provisional application No. 60/969,039, filed on Aug. 30, 2007.

(51) Int. Cl.
*B60J 3/00* (2006.01)
*B60J 3/02* (2006.01)
(52) U.S. Cl.
CPC ................................. *B60J 3/0213* (2013.01)
USPC ......................................................... 296/97.9
(58) Field of Classification Search
USPC ......... 296/97.9, 29; 248/503, 728.2; 224/924;
411/182, 183, 55, 60.2, 508; 362/549
See application file for complete search history.

(56) References Cited

U.S. PATENT DOCUMENTS 2,238,238 A * 4/1941 Westrope .......................... 24/293
2,884,283 A * 4/1959 Korol et al. .................... 384/439

(Continued)

FOREIGN PATENT DOCUMENTS

| DE | 10 2005 061 450 A1 | 7/2007 |
| EP | 1426217 A1 | 6/2004 |
| WO | WO 99/62731 A1 | 12/1999 |

OTHER PUBLICATIONS

International Preliminary Report of Patentability mailed Mar. 2, 2010 in PCT/US2008/074770, 8 pages.

(Continued)

*Primary Examiner* — Kiran B Patel
(74) *Attorney, Agent, or Firm* — Foley & Lardner LLP

(57) ABSTRACT

A snap-in fastener is provided for securing a vehicle component to a vehicle structure. The fastener comprises a base having a longitudinal axis, a first leg extending downwardly and outwardly from the base and configured to apply a force to the vehicle structure in a first direction, and a second leg extending downwardly from the base and configured to apply a force to the vehicle structure in a second direction that is substantially opposite the first direction. The first leg may have a first portion extending from the base at a first angle relative to the longitudinal axis and a second portion extending from the first portion at a second angle relative to the longitudinal axis that is different than the first angle. The first leg may also have a foot having a contact surface with an inwardly extending profile for engaging an edge of the vehicle structure.

6 Claims, 4 Drawing Sheets

(56) References Cited

U.S. PATENT DOCUMENTS

| | | | | |
|---|---|---|---|---|
| 4,422,222 A * | 12/1983 | Notoya | .............. | 24/614 |
| 4,529,157 A * | 7/1985 | Suman et al. | .............. | 248/291.1 |
| 4,989,911 A * | 2/1991 | Van Order | .............. | 296/97.9 |
| 5,056,853 A * | 10/1991 | Van Order | .............. | 296/97.9 |
| 5,061,005 A * | 10/1991 | Van Order et al. | .............. | 296/97.9 |
| 5,201,564 A | 4/1993 | Price | | |
| 5,967,589 A * | 10/1999 | Spadafora | .............. | 296/97.9 |
| 6,021,986 A * | 2/2000 | Murdock | .............. | 248/289.11 |
| 6,250,708 B1 * | 6/2001 | Kurachi | .............. | 296/97.9 |
| 6,406,087 B2 * | 6/2002 | Sawayanagi | .............. | 296/97.9 |
| 6,511,029 B2 * | 1/2003 | Sawayanagi | .............. | 248/224.8 |
| 6,558,193 B2 * | 5/2003 | Sawayanagi et al. | .............. | 439/545 |
| 6,669,263 B2 * | 12/2003 | Asai | .............. | 296/97.9 |
| 6,799,743 B2 * | 10/2004 | Sawayanagi | .............. | 248/27.1 |
| 6,817,583 B2 * | 11/2004 | Wilson | .............. | 248/231.9 |
| 7,086,124 B2 * | 8/2006 | Del Pozo Abejon | .............. | 24/295 |
| 7,306,419 B2 * | 12/2007 | Lepper | .............. | 411/508 |
| 8,220,858 B2 * | 7/2012 | Moenter | .............. | 296/97.9 |
| 2002/0017800 A1 * | 2/2002 | Ichikawa et al. | .............. | 296/97.9 |
| 2004/0004368 A1 * | 1/2004 | Davey et al. | .............. | 296/97.9 |

OTHER PUBLICATIONS

International Search Report corresponding to PCT/US2008/074770, dated Nov. 26, 2008, 3 pages.
Office Action in CA Appln No. 2,697,534 dated Mar. 1, 2013.

* cited by examiner

SNAP-IN FASTENER

CROSS-REFERENCE TO RELATED PATENT APPLICATIONS

This application is a National Stage of PCT/US2008/074770, filed Aug. 29, 2008, which claims the benefit and priority under 35 U.S.C. §119(e) of U.S. Provisional Application No. 60/969,039, having a filing date of Aug. 30, 2007, titled "Snap-In Fastener,". The foregoing applications are incorporated by reference herein in their entirety.

BACKGROUND

The present disclosure relates generally to a fastener for a vehicle. More specifically, the present disclosure relates to a fastener for securing a vehicle component to the vehicle (e.g., a fastener for securing a visor and/or a headliner to a vehicle roof, etc.).

A variety of fasteners exist for securing a vehicle component to a vehicle. For example, fasteners are used for securing a vehicle visor and/or headliner to a roof of a vehicle. One type of fastener that may be used is a snap-in fastener or clip. The snap-in construction may increase the ease of construction of a vehicle interior. Snap-in fasteners or clips may be used as a separate component to secure a vehicle component to a vehicle or may be used to form a sub-assembly with the vehicle component that may then be subsequently secured to a vehicle. For example, a snap-in fastener may be used to form a sub-assembly with a vehicle visor and/or headliner that is subsequently snapped into a structural portion (e.g., sheet metal roof, etc.) of a vehicle. There continues to be a need for a snap-in fastener that requires less force to snap into place when installing a vehicle component and/or that provides a more secure attachment of the vehicle component to a structural portion of a vehicle once installed.

SUMMARY

One embodiment relates to a snap-in fastener for securing a vehicle component to a vehicle structure. The fastener comprises a base having a longitudinal axis, a first leg extending downwardly and outwardly from the base and configured to apply a force to the vehicle structure in a first direction, and a second leg extending downwardly from the base and configured to apply a force to the vehicle structure in a second direction that is substantially opposite the first direction. The first leg has a first portion extending from the base at a first acute angle relative to the longitudinal axis and a second portion extending from the first portion at a second acute angle relative to the longitudinal axis that is different than the first acute angle. The second portion supports a foot configured to engage an edge of the vehicle structure. The second leg is spaced apart from the first leg.

Another embodiment also relates to a snap-in fastener for securing a vehicle component to a vehicle structure. The fastener comprises a base; a first leg extending downwardly and outwardly from the base and configured to apply a force to the vehicle structure in a first direction, and a second leg extending downwardly from the base and configured to apply a force to the vehicle structure in a second direction that is substantially opposite the first direction. The first leg includes a foot configured to engage an edge the vehicle structure. The foot has a contact surface with an inwardly extending profile for engaging the edge. The second leg is spaced apart from the first leg.

Another embodiment relates to a mounting assembly configured to be secured to a structural portion of a vehicle. The mounting assembly comprises a vehicle component, a mounting bracket coupled to the vehicle component, and a snap-in fastener coupled to the mounting bracket. The fastener comprises a base; a first leg extending downwardly and outwardly from the base and configured to apply a force to the structural portion of the vehicle in a first direction, and a second leg extending downwardly and outwardly from the base and configured to apply a force to the structural portion in a second direction that is substantially opposite the first direction. The first leg includes a foot configured to engage an edge the structural portion. The foot has a contact surface with an inwardly extending profile for engaging the edge. The second leg is spaced apart from the first leg.

DETAILED DESCRIPTION

Referring generally to the FIGURES, exemplary embodiments of a fastener for securing a vehicle component to a structural portion of a vehicle (e.g., automobiles such as cars, trucks, sport utility vehicles, minivans, buses, and the like; airplanes, boats, etc.) are shown. The fastener is configured to be inserted into an opening in the structural portion of the vehicle and generally includes a base with one or more first or spring legs and one or more second or support legs extending downwardly therefrom. Once the fastener is inserted into the opening in the structural portion of the vehicle, such as a vehicle roof, the first leg is configured to exert a first force in a direction towards one surface or side of the structural portion (e.g., a substantially downward force, etc.) and the second leg is configured to exert a second force in a direction towards another surface or side (e.g., a substantially opposite surface or side, etc.) of the structural portion (e.g., a substantially upward force, etc.). The first leg of the fastener may have a configuration that reduces the amount of force needed to insert the fastener into the opening and/or that improves the retention or engagement between the fastener and the structural portion once installed.

The fastener is shown and described herein according to an exemplary embodiment as a snap-in fastener 100 that is configured to engage a roof of a vehicle 10 to secure a visor assembly thereto. Although the fastener is shown and described with reference to a snap-in fastener for a securing a visor assembly to a vehicle roof, it is to be understood that this embodiment is merely illustrative of the principles and applications of the present inventions. Such a fastener may also be used in any other suitable location within a vehicle (e.g., side walls, floors, overhead systems, etc.) for securing any of a variety of vehicle components (e.g., headliners, grab bars, consoles, trim panels, entertainment devices, user interfaces, etc.) within a vehicle. The fasteners may be provided in a wide variety of sizes, shapes, and configurations, and made from a wide variety of materials and manufacturing processes according to various exemplary embodiments.

Figure 1:
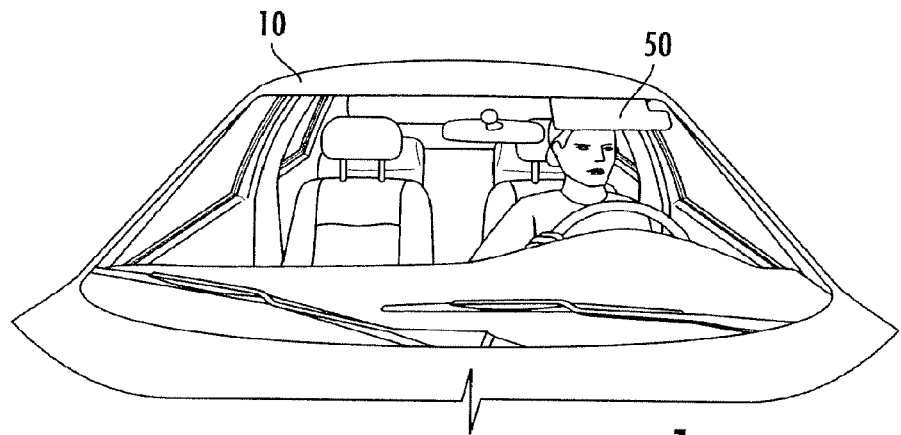
FIG. 1 is a front perspective view of a vehicle according to an exemplary embodiment.
Figure 2:
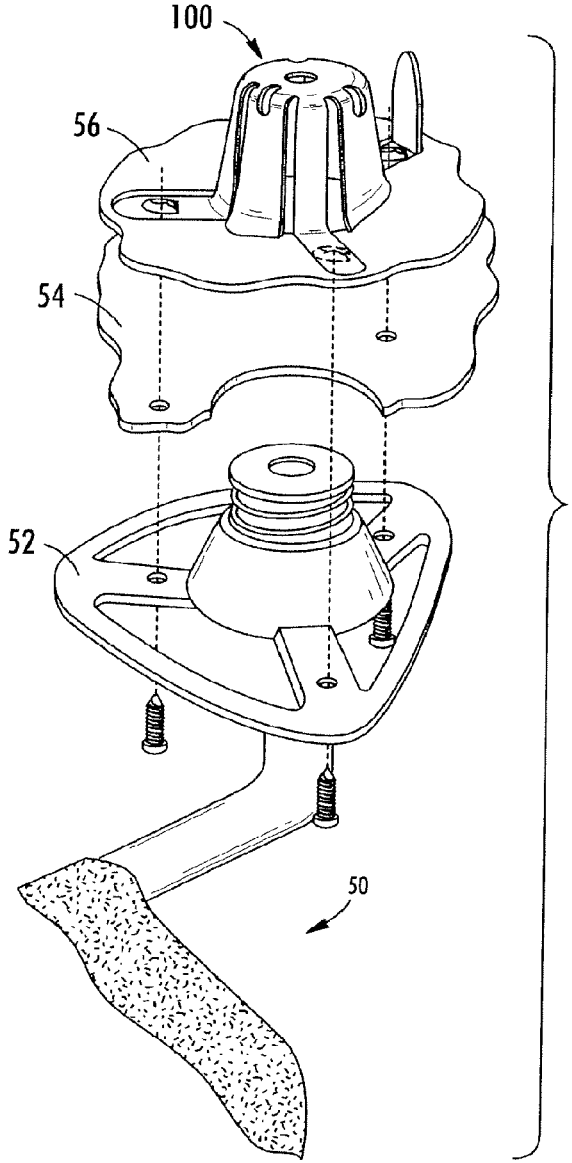
FIG. 2 is an exploded isometric view of a mounting assembly including a snap-in fastener according to an exemplary embodiment.

Referring to FIG. 2, there is shown a mounting arrangement including a vehicle component, shown as a visor 50, according to an exemplary embodiment. The mounting arrangement is shown as including visor 50, a mounting bracket 52, a headliner 54, a vehicle roof 56 and snap-in fastener 100. Snap-in fastener 100 is coupled to mounting bracket 52 and vehicle roof 56 for securing visor 50 and/or headliner 54 to vehicle roof 56. According to the embodiment illustrated, mounting bracket 52 and snap-in fastener 100 are provided on opposite sides of headliner 54 and are coupled together with a fastener (e.g., clip, pin, etc.), shown as a screw, trapping headliner 54 between snap-in fastener 100 and mounting bracket 52. Headliner 54 can be made of conventional construction and include, for example, a molded polymeric or other substrate to which a decorative fabric is integrally attached. Snap-in fastener 100 is inserted into an aperture 58 (shown in FIG. 3) in vehicle roof 56 until a portion of snap-in fastener 100 engages the edges vehicle roof 56 defining aperture 58 with a snap fit. According to the various alternative embodiments, snap-in fastener 100 may be first coupled to mounting bracket 52 and then inserted through an aperture in the headliner and aperture 58 in roof 56. In such an embodiment, headliner 54 would be trapped between snap-in fastener 100 and roof 56.

Figure 3:
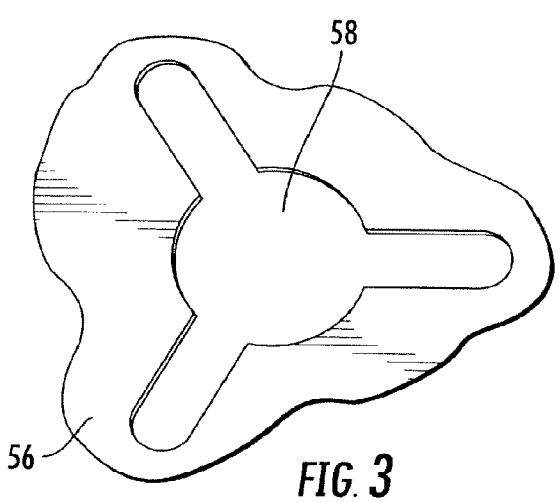
FIG. 3 is a top plan view of an aperture in a vehicle structure that is configured to receive the snap-in fastener of FIG. 2.

Snap-fit fastener 100 may be configured to engage any of a variety of apertures in a structural portion of a vehicle. One such example is shown in FIG. 3. According to the embodiment illustrated, aperture 58 includes a generally circular central aperture and three spaced-apart slots that extend outward from the central aperture. The slots are equally spaced in approximately 120 degree intervals around the periphery of the central aperture. The structural portion of vehicle 10 which includes aperture 58 (e.g., a sheet metal roof, etc.) may be the front header of vehicle 10, either of the A-pillars, or other suitable structural member having a structure (e.g., a single layer of sheet metal, etc.) sufficiently rigid to support the one or more vehicle components (e.g., visor 50 and headliner 54, etc.).

Referring to FIGS. 4 through 9, snap-in fastener 100 is shown according to an exemplary embodiment. Snap-in fastener 100 includes a hub or base 102, a first projection or leg 104 (e.g., spring leg, etc.) and a second projection or leg 106 (e.g., support leg, attachment leg, etc.). According to the embodiment illustrated, once snap-in fastener 100 is installed, first leg 104 is configured to exert a substantially downward force directly on an upper surface of roof 56, while second leg 106 is configured to exert a substantially upward force directly on a lower surface of roof 56. If snap-in fastener 100 is coupled to mounting bracket 52 before being inserted through headliner 54 and roof 56, first leg 104 would still exert a substantially downward force directly on the upper surface of roof 56, but second leg 106 would then exert a substantially upward force directly on headliner 54. As can be appreciated, one or more intermediate members may be provided between snap-in fastener 100, headliner 54 and/or roof 56 such that snap-in fastener 100 would be configured to exert an indirect force to one or more of such structures.

To accommodate aperture 58 of FIG. 3, snap-in fastener 100, according to an exemplary embodiment, is a spider-like member having more than one first leg 104 and second leg 106. For example, snap-in fastener 100 is shown as having a total of six legs, i.e., three first legs 104 and three second legs 106 that are alternately staggered. According to an exemplary embodiment, the three first legs 104 and the three second legs 106 extend outward and downward from an outer periphery or edge of base 102 to form a generally circular profile around the outer periphery base 102. Base 102 may be configured to function as a locator for inserting the snap-in fastener 100 into aperture 58 by having a circular profile with a diameter that is smaller than the diameter of the central aperture of aperture 58.

To further accommodate aperture 58 of FIG. 3, first legs 104 are equally spaced in approximately 120 degree intervals around the periphery of base 102. Likewise, second legs 106 are equally spaced in approximately 120 degree intervals around the periphery of base 102 and are in an alternately staggered relationship with first legs 104. Each of first legs 104 and second legs 106 are shown as being separated by slots extending between the legs. According to the various exemplary embodiments, any number of first legs 104 and second legs 106 may be provided, at any of a number of positions and orientations.

Figure 4:
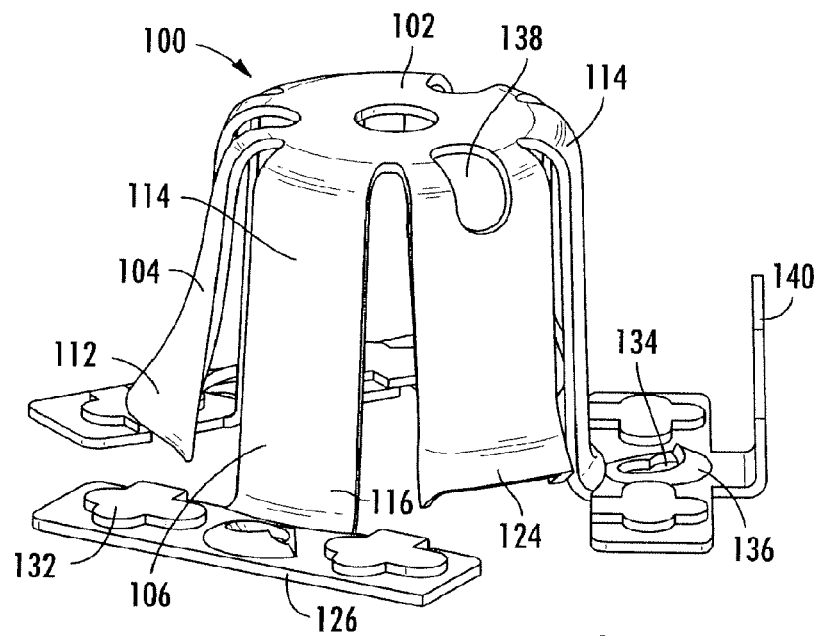
FIG. 4 is an isometric view of the snap-in fastener of FIG. 2.
Figure 5:
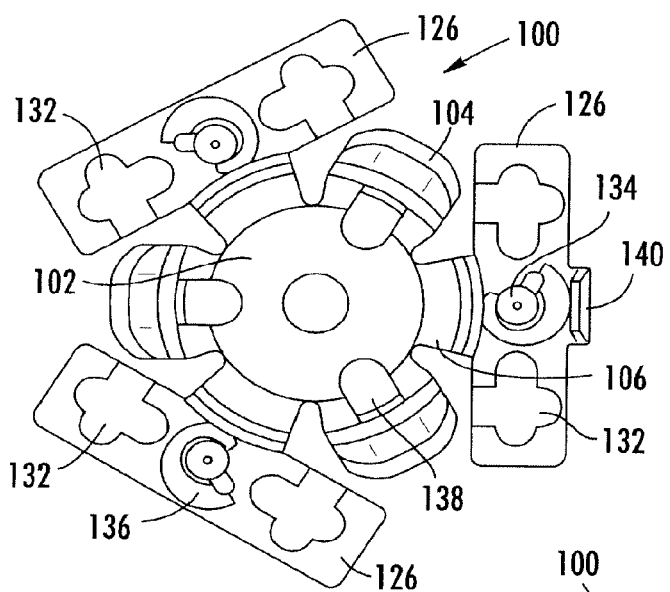
FIG. 5 is a top plan view of the snap-in fastener of FIG. 2.
Figure 6:
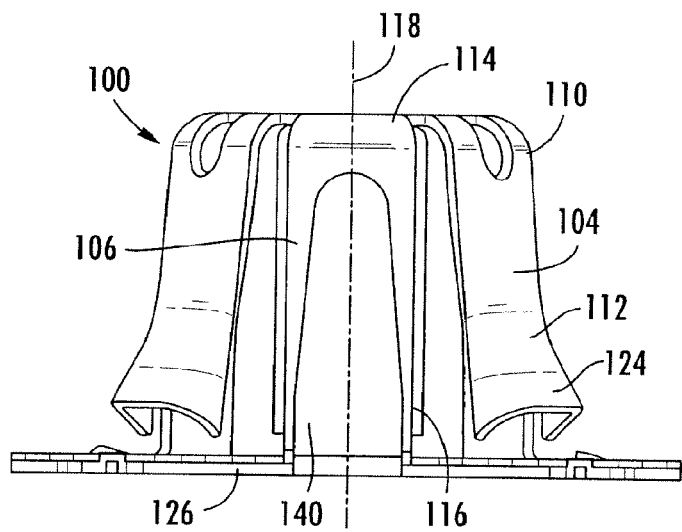
FIG. 6 is a side view of the snap-in fastener of FIG. 2.

Referring to FIGS. 4 through 6 in particular, first leg 104 has a first or proximate end 110 coupled to base 102 and a second or distal end 112 that is substantially a free end. The second end 112 defines an engagement portion, shown as a foot 124, for engaging an edge of a structural portion of the vehicle (e.g., roof 56, etc.). Second leg 106 has a first or proximate end 114 coupled to base 102 and a second or distal end 116 that terminates in a base section, shown as a support member 126. According to an exemplary embodiment, first leg 104 and second leg 106 are integrally formed with base 102 to provide a one-piece fastener. According to the various alternative embodiments, one or more of first leg 104 and second leg 106 may be a separate member that is subsequently attached to base 102.

According to an exemplary embodiment, snap-in fastener 100, including base 102, first leg 104 and second leg 106, is formed of a resilient spring-like material that is configured to flex. For example, snap-in fastener 100 may be formed of a suitable spring steel material, such as 1074 spring steel having a thickness of approximately 0.67 mm and finished with anti-oxidation finish. Forming snap-in fastener 100 of a resilient material may allow first leg 104 and/or second leg 106 to flex inwardly as snap-in fastener 100 is inserted through aperture 58. According to the various alternative embodiments, snap-in fastener 100 may be formed of any known or otherwise suitable resilient material or combination of materials that is capable of flexing.

As shown in FIG. 6, base 102, first leg 104 and second leg 106 cooperate to define a member having a longitudinal or central axis 118 that extends in a vertical direction relative to snap-in fastener 100. According to an exemplary embodiment, first leg 104 and second leg 106 extend downwardly and outwardly from base 102 such that first leg 104 and second leg 106 are orientated at an angle relative to axis 118. As such, snap-in fastener 100 is narrower at base 102 than at some other position between first end 110 and second end 112 of first leg 104 and between first end 114 and second end 116 of second leg 106 (e.g., the distal ends, etc.). Such a configuration allows base 102 to function as a lead-in or locator for inserting fastener 100 into aperture 58.

Figure 7:
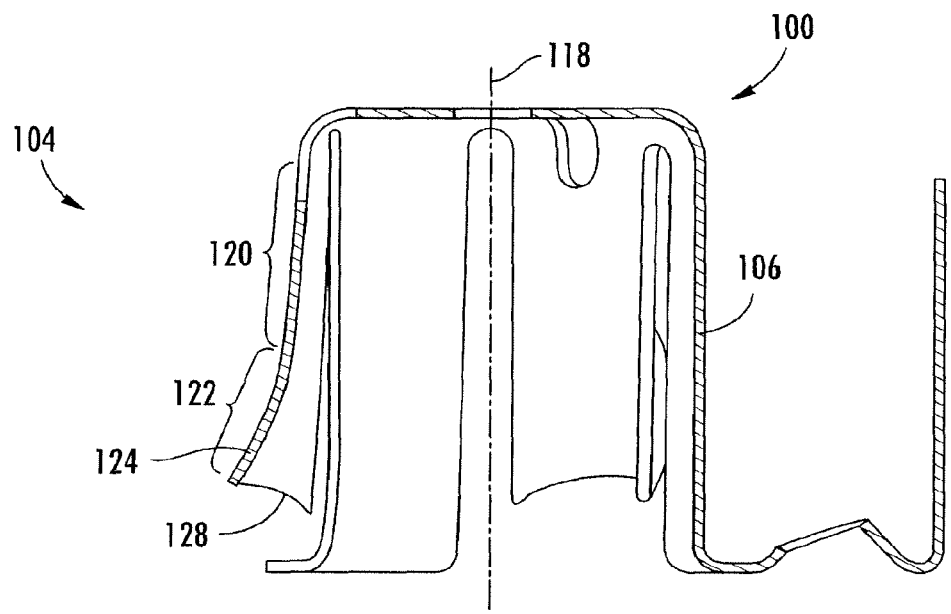
FIG. 7 is a cross sectional view through a spring leg of the snap-in fastener of FIG. 2.

Referring to FIG. 7, first leg 104 includes a first portion or segment, shown as an upper portion 120, that extends downwardly and outwardly at a first acute angle relative to axis 118 and a second portion or segment, shown as a lower portion 122, that extends downwardly and outwardly at a second acute angle relative to axis 118. According to an exemplary embodiment, the first acute angle is different than the second acute angle to provide a first leg 104 that is non-linear (i.e., not extending in a straight line between first end 110 and second end 112). In a preferred embodiment shown, for example, in FIGS. 7 and 9, the second acute angle is larger than the first acute angle. For example, first leg 104 may have a profile between first end 110 and second end 112 that is a substantially continuous curve, a combination of linear segments, one or more linear segments in combination with one or more curved segments or any other configuration that may be desirable.

According to the embodiment illustrated, upper portion 120 of first leg 104 is a generally vertical portion that is substantially parallel to axis 118 and lower portion 122 of first leg 104 flares outward from upper portion 120 in a substantially curved manner. Such a configuration allows upper portion 120 to pass through aperture 58 relatively unimpeded (e.g., without substantially contacting the edge of roof 56 around aperture 58, etc.) as snap-in fastener 100 is inserted into aperture 58. According to an exemplary embodiment, snap-in fastener 100 can be inserted approximately 15 millimeters into aperture 58 before the edges roof 56 defining of aperture 58 contact an outer surface of first leg 104. Such a configuration may help to insure that snap-in fastener 100 is located within aperture 58 and will not slip out of aperture 58 when an additional force is applied to snap-fit fastener 100 to snap it into place. Such a configuration may also help to reduce the amount of force needed to secure snap-fit fastener 100 to roof 56 (e.g., by reducing the amount of time that snap-in fastener 100 is in contact with roof 56 during the insertion process, etc.).

According to the various alternative embodiments, upper portion 120 and lower portion 122 of first leg 104 may be provided at any angle relative to axis 118 and/or relative to each other. For example, it may be desirable to provide upper portion 120 at an acute angle relative to axis 118 that is greater than zero (e.g., between approximately 0 degrees and approximately 30 degrees, etc.). Also, in certain applications it may be desirable to provide upper portion 120 and lower portion 122 at the same angle relative to axis 118. Further, as noted above, upper portion 120 and lower portion 122 may be substantially linear segments, curved segments or combinations thereof.

According to an exemplary embodiment, first leg 104 is configured to flex inward during installation when the outer surface of first leg 104 (e.g., an outer surface of lower portion 122, etc.) engages the edge of roof 56 at aperture 58. To facilitate the flexing of first leg 104 during installation, a cutout or aperture 138 (shown in FIG. 4) is provided in first spring leg 104. For example, aperture 138 may be provided at first end 110 of first leg 104 to reduce the amount of force needed to flex first leg 104 inward while inserting snap-in fastener 100 into aperture 58.

Figure 8:
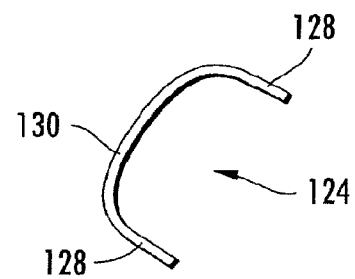
FIG. 8 is an end view of the spring leg of the snap-in fastener of FIG. 2.

Referring to FIGS. 7 and 8, foot 124 is shown according to an exemplary embodiment. As noted above, foot 124 is configured to engage the edge of roof 56 defining aperture 58 to secure snap-in fastener 100 in the installed position. As snap-in fastener 100 is inserted (e.g., pushed, etc.) upward into aperture 58, first leg 104 is forced inward due to the engagement between an outer surface of first leg 104 and the edge of roof 56 at aperture 58. Once the outer surface of first leg 104 clears aperture 58, foot 124 snaps outward to engage the edge of roof 56. According to an exemplary embodiment, foot 124 has a relatively wide stance or footprint to provide stability when foot 124 engages roof 56. According to the embodiment illustrated, foot 124 has a U-shaped profile when viewed transversely (as best shown in FIG. 8) which provides for the relatively wide footprint. The transverse profile of foot 124 is defined by a pair of edge contact portions or surfaces 128 and a cross member or surface 130 extending therebetween. According to the embodiment illustrated, when viewed transversely, edge contact surfaces 128 are substantially linear segments that are generally parallel to each other and cross surface 130 is an outwardly curved segment extending therebetween.

According to the various alternative embodiments, foot 124 may have any of a number of suitable traverse profiles which are configured to secure snap-in fastener 100 to a structural portion of a vehicle. For example, foot 124 may have a U-shaped profile wherein the cross surface is a substantially straight segment or wherein the cross surface curves inward. According to further alternative embodiments, edge contact surface 128 of foot 124 may be orientated at any of a variety of angles when viewed transversely and/or may be non-linear. According to still further alternative embodiments, foot 124 may be a substantially solid member having a substantially continuous contact surface configured to engage the edge of roof 56 at aperture 58.

Referring further to FIG. 7, when viewed from the side, edge contact surfaces 128 of foot 124 extend downward from cross surface 130 in a non-linear manner (i.e., not in a straight line). According to an exemplary embodiment, the profile of edge contact surfaces 128 extends inward (i.e., away from the edge about which edge contact surfaces 128 are configured to engage). According to the embodiment illustrated, the profile of edge contact surfaces 128 is curved inward in a substantially concave manner. As such, snap-in fastener 100 is provided with two concave contact surfaces that engage the edge of roof 56 at aperture 58 (e.g., one at each edge contact surface 128, etc.). According to the various alternative embodiments, the inwardly extending profile of edge contact surfaces 128 may be defined by linear segments, curved segments and/or combinations thereof. For example, the inwardly extending profile may be defined by two linear segments which provide a substantially V-shaped profile.

As a downward force is applied to snap-in fastener 100 (e.g., a force applied by the weight of visor 50 and/or headliner 54, a force applied by an occupant on visor 50, etc.), the relatively wide stance of foot 124 and the inwardly-shaped profile (e.g., concave profile, etc.) of edge contact surfaces 128 help to create a greater area of contact between snap-in fastener 100 and roof 56. By increasing the area of contact between snap-in fastener 100 and roof 56, the chance that edge contact surfaces 128 will slip (e.g., disengage, etc.) and allow snap-in fastener 100 to be pulled back through aperture 58 may be reduced.

Referring to back to FIGS. 4 through 6, second leg 106 is shown according to an exemplary embodiment. Second leg 106 is shown as extending downwardly and outwardly in a substantially straight line between first end 114 and second end 116. According to the various alternative embodiments, second leg 106 may extend from base 102 in any of a number of profiles (e.g., linear, curved, combinations thereof, etc.). According to further various alternative embodiments, second leg 106 may extend downward from base 102 without extending outwardly. As noted above, second end 116 terminates in support member 126 which is configured to engage an upper surface of headliner 54 and the lower surface of roof 56 according to the embodiment illustrated.

Referring to FIG. 5 in particular, support member 126 is shown according to an exemplary embodiment. When viewed from above, support member 126 is shown as having a substantially rectangular shape. According to an exemplary embodiment, support member 126 includes one or more projections or raised portions 132 extending from an upper surface of support member 126. According to the embodiment illustrated, raised portions 132 are in the form of pattern such as a cross-hatch pattern for providing a contact pattern against the lower surface of roof 56. Second leg 106, and in particular raised portions 132, cooperate with first leg 104 to couple snap-in fastener 100 to roof 56 by compressing opposite sides of roof 56.

According to an exemplary embodiment, support member 126 also includes one or more fastening elements, shown as an aperture 134, configured to cooperate with a corresponding fastening element (e.g., screw, clip, etc.) for securing mounting bracket 52 and/or visor 50 to snap-in fastener 100. According to the embodiment illustrated, support member 126 includes a single aperture 134 that is centrally located therein between a pair of raised portions 132, but alternatively, may include any of a number of apertures 134 in any of a number of positions.

According to an exemplary embodiment, aperture 134 is a thread forming aperture having an angled surface, shown as a ramp 136, that is provided at the upper surface of support member 126 at least partially around aperture 134. Such is embodiment is formed by providing a generally circular center aperture with an outwardly extending notch and forming at the periphery of the aperture, an inclined spiral ramp 136 to define an inclined surface to engage the threads of a screw or clip.

According to an exemplary embodiment, support member 126 may further include a projection, shown as a tab 140 in FIG. 4, that extends upward from support member 126. Tab 140 is configured to extend upward through one of the slots of aperture 58 to help locate snap-in fastener 100 in aperture 58 during installation. Tab 140 may also act as an anti-rotation feature when inserted into one of the slots of aperture 58 to limit the rotation of snap-in fastener 100 around axis 118.

Figure 9:
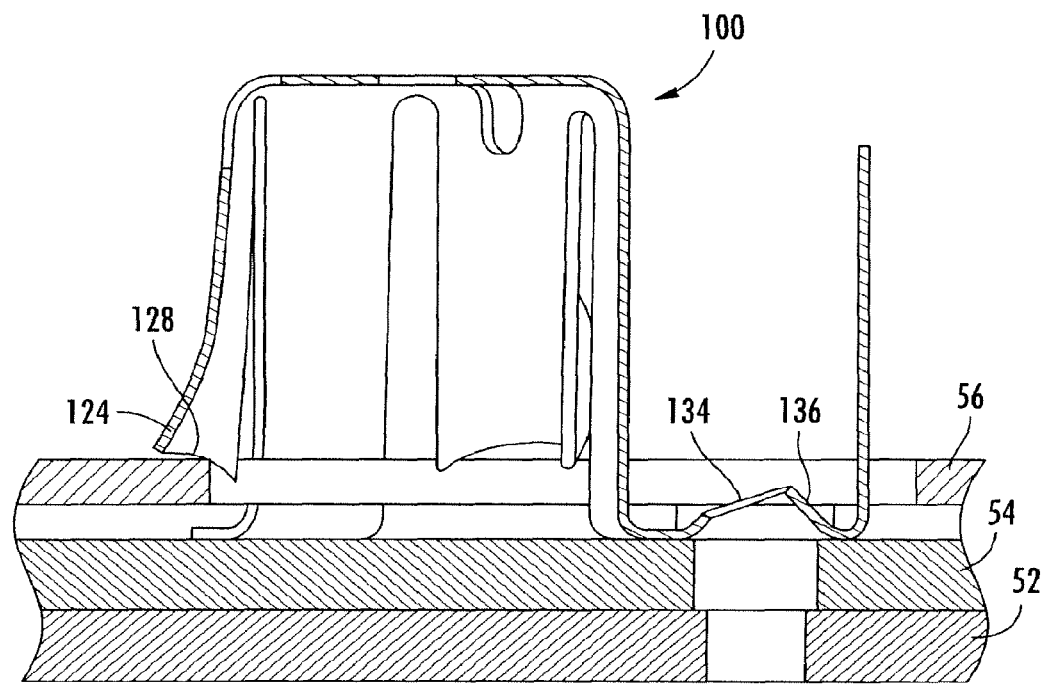
FIG. 9 is a cross sectional view of the snap-in fastener of FIG. 2 secured to the vehicle structure.

During insertion, first leg 104, assisted by aperture 138, deflects inwardly when the outer surface of first leg 104 engages the edge of roof 56 at aperture 58 until a portion of foot 124 clears an upper surface roof 56. Once a portion of foot 124 clears the upper surface of roof 56, first leg 104 extends (e.g., flexes, snaps, etc.) outward into a locking or installed position as shown in FIG. 9. In the installed position, edge contact surfaces 128 engage the edge of roof 56 at aperture 58 to secure or lock snap-in fastener 100. According to the embodiment illustrated, once installed, headliner 54 is trapped between mounting bracket 52 and snap-in fastener 100, which is in compressive engagement with roof 56. In this position, raised portions 132 of support member 126 engage a lower surface of roof 56 in the areas adjacent to the slots extending outward from the central aperture of aperture 58. With snap-in fastener 100 coupled to roof 56, visor 50, mounting bracket 52 and/or headliner 54 may be removed (e.g., for repair or replacement, etc.) by removing any fasteners (e.g., screws, etc.) used to secure such components to snap-in fastener 100.

Figures 10A, 10B, 10C:
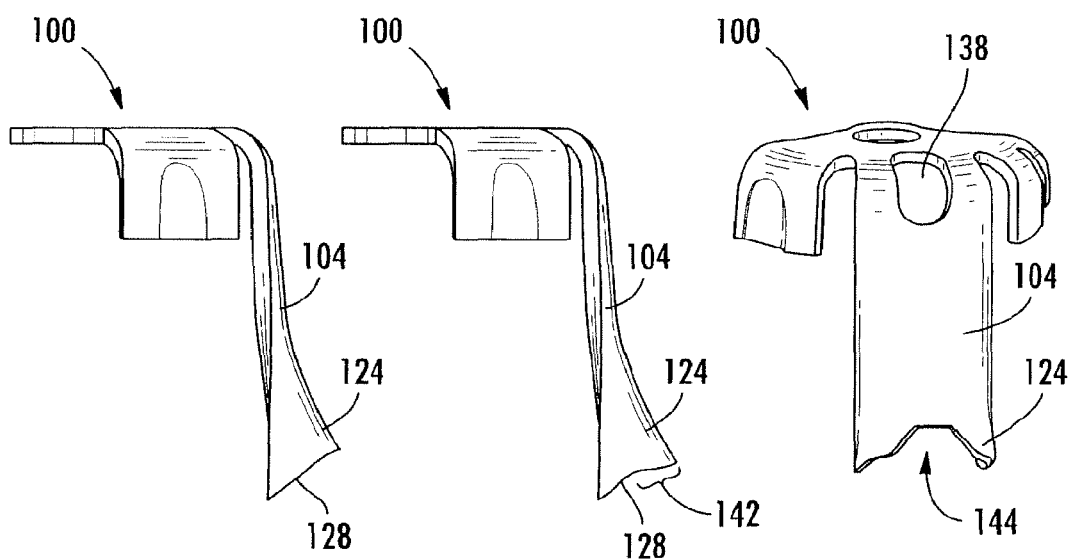
FIG. 10A is a partial isometric view of a snap-in fastener according to another exemplary embodiment.
FIG. 10B is another partial isometric view of a snap-in fastener according to another exemplary embodiment.
FIG. 10C is another partial isometric view of a snap-in fastener according to another exemplary embodiment.

The physical properties of snap-in fastener 100, including the force needed to insert snap-in fastener 100 into an aperture of the structural portion of the vehicle and/or the amount of downward force (e.g., weight, etc.) snap-in fastener 100 can support, may be altered by adjusting the shape of snap-in fastener 100. For example, the size of apertures 138 in first end 110 of first arms 104 may be enlarged to increase the amount of flex in first leg 104. Further, the size of the slots separating first leg 104 from second leg 106 may be enlarged to increase the amount of flex in at least first leg 104. Referring to FIG. 10A, first leg 104 may include substantially linear edge contact surfaces 128 for foot 124. FIG. 10B, first leg 104 may include curved edges contact surfaces 128 for foot 128 that have a substantially horizontal or flat portion 142 at an end of the surfaces. Inclusion of flat portion 142 may assist in retaining snap-in fastener 100 in the locked position. Referring to FIG. 10C, first leg 104 is shown as having a cutout of notch 144 in foot 124 between edge contact surfaces 128. Inclusion of notch 144 may further assist in reduce the amount of force needed to insert snap-in fastener 10 by increasing the flex in first leg 104.

Figure 11:
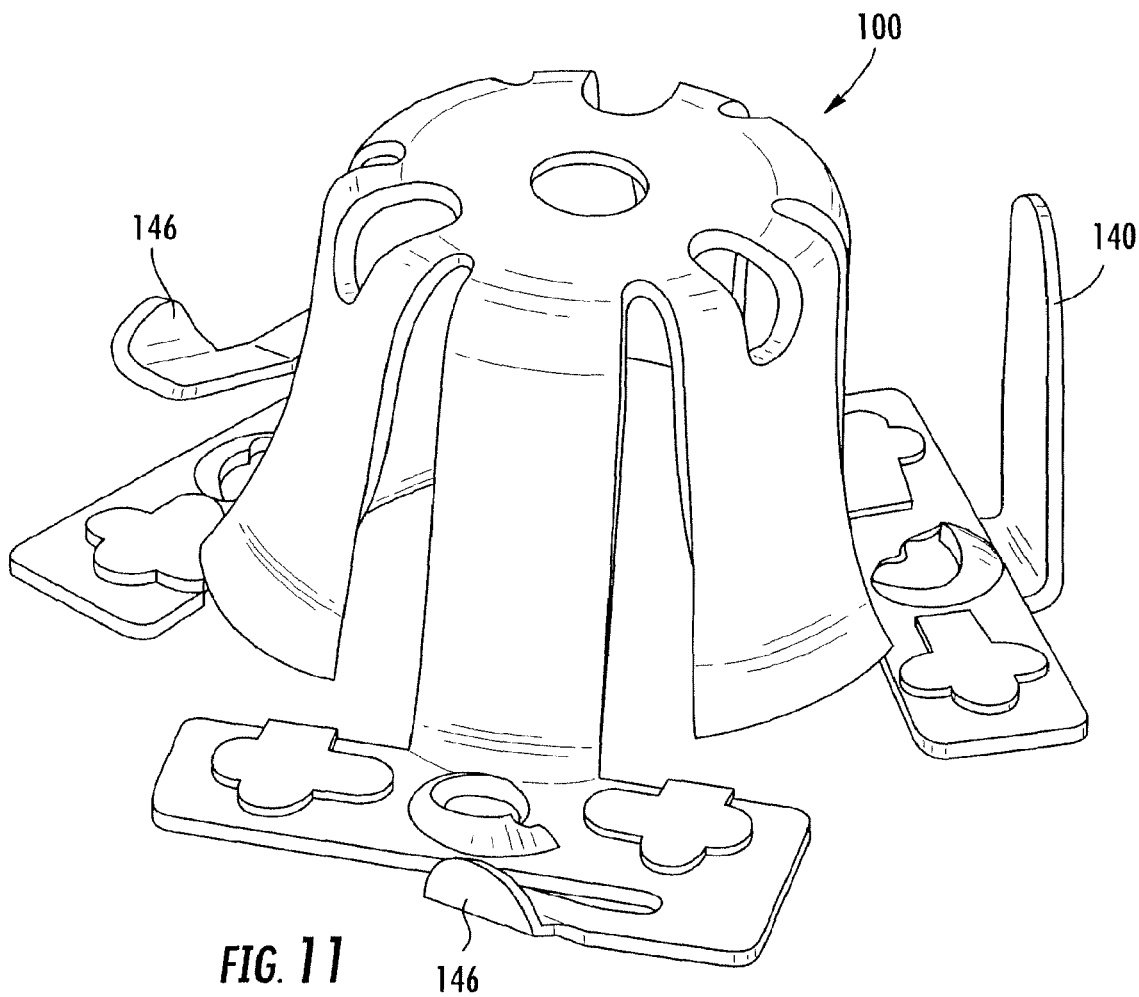
FIG. 11 is an isometric view of a snap-in fastener according to another exemplary embodiment.

Referring to FIG. 11, snap-in fastener 100 may also include an additional projection, shown as a second locator tab 146, extending upward from another support member 126. Second locator tab 146 is configured to extend upward through one of the slots of aperture 58 to help locate snap-in fastener 100 in aperture 58, and may further act as an anti-rotation feature for snap-in fastener 100 when located in the corresponding slot of aperture 58.

The construction and arrangement of the elements of the fastener as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability. Components such as those shown herein may be used in non-vehicle applications as well. Other substitutions, modifications, changes and omissions may be made in the design, operating conditions and arrangement of the preferred and other exemplary embodiments without departing from the scope of the appended claims.

What is claimed is:

1. A mounting assembly configured to be secured to a structural portion of a vehicle that has a first side, a second side, and an aperture that extends through the structural portion from the first side to the second side, the mounting assembly comprising:
   a vehicle component;
   a mounting bracket coupled to the vehicle component; and
   a snap-in fastener coupled to the mounting bracket, the fastener comprising:
      a base;
      a first leg extending downwardly and outwardly from the base and configured to apply a force in a first direction to an edge of the aperture on the first side of the structural portion of the vehicle, the first leg including a foot configured to engage the edge, wherein the foot has a substantially U-shaped cross section defined by first and second substantially parallel members and a cross member, wherein the first parallel member has a first contact surface with a first concave profile when viewed normal to a first plane running through a longitudinal axis of the snap-in fastener and a centerline of the first leg and the second parallel member has a second contact surface with a second concave profile when viewed normal to a second plane running through the longitudinal axis of the snap-in fastener and the centerline of the first leg, wherein the first and second concave profiles of the first and second contact surfaces are configured to engage the edge to apply force in the first direction to secure the fastener in the structural portion; and a second leg extending downwardly and outwardly from the base and configured to apply a force to the second side of the structural portion in a second direction that is substantially opposite the first direction, the second leg being spaced apart from the first leg.

2. The mounting assembly of claim 1 wherein the first leg has a first portion extending from the base at a first angle relative to the longitudinal axis and a second portion extending from the first portion at a second angle relative to the longitudinal axis that is larger than the first angle to allow the first portion to be inserted into the aperture relatively unimpeded.

3. The mounting assembly of claim 1 wherein the vehicle component is a visor.

4. The mounting assembly of claim 1 wherein the snap-in fastener comprises more than one first leg and more than one second leg.

5. The mounting assembly of claim 1 wherein the first leg includes a first portion extending from the base at a first angle relative to the longitudinal axis and a second portion extending from the first portion at a second angle relative to the longitudinal axis that is different than the first angle.

6. The mounting assembly of claim 5 wherein the second portion is non-linear.

* * * * *